Feb. 15, 1966 W. A. WARD 3,235,752
ELECTRIC SYSTEM FOR GENERATING PULSES
Filed Dec. 27, 1962
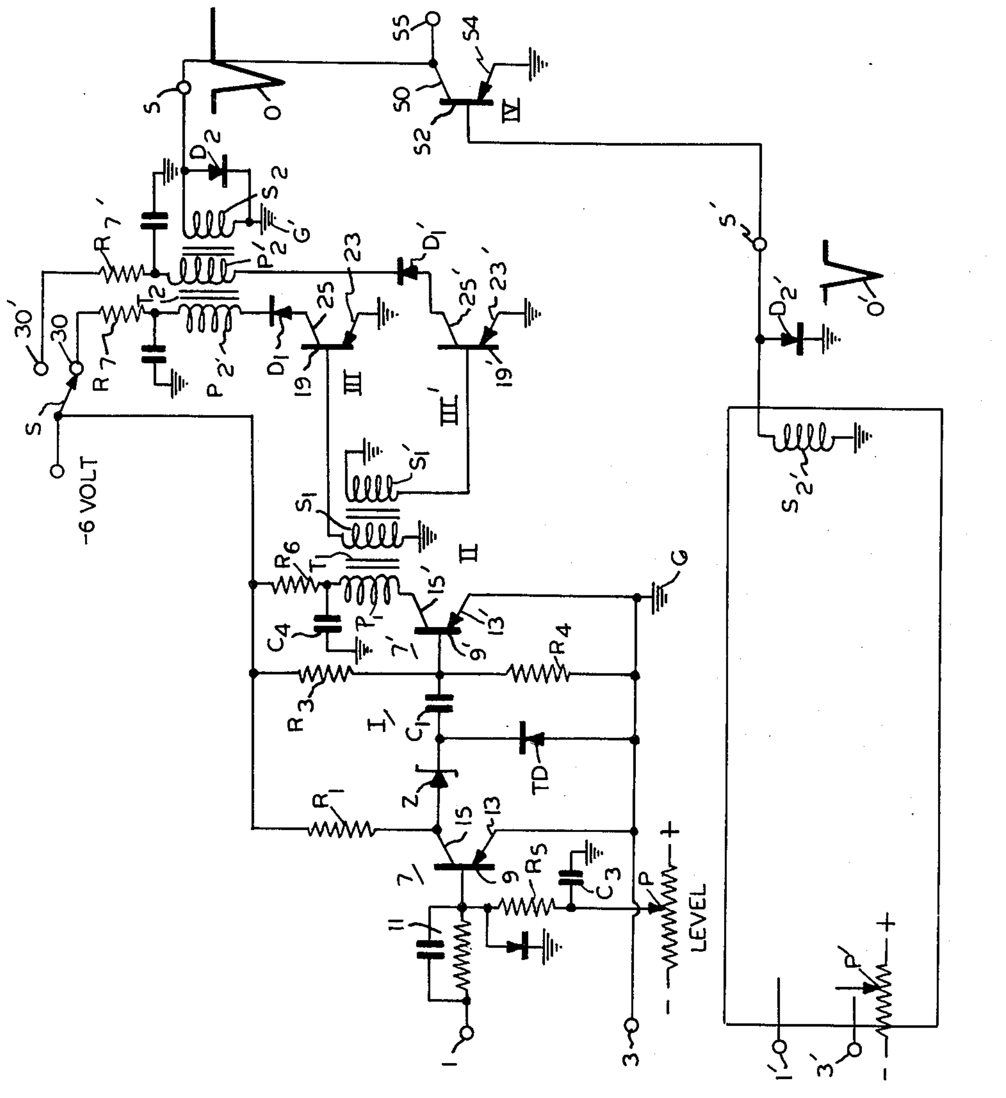
INVENTOR
WILLIAM A. WARD
BY *Rines and Rines*
ATTORNEYS United States Patent Office 3,235,752

Patented Feb. 15, 1966

3,235,752

ELECTRIC SYSTEM FOR GENERATING PULSES

William A. Ward, Norwood, Mass., assignor to United States Scientific Instruments, Inc., Watertown, Mass., a corporation of Massachusetts Filed Dec. 27, 1962, Ser. No. 247,712
10 Claims. (Cl. 307—88.5)

The present invention relates to electric systems for generating pulses and, more particularly, to the production of very narrow high-speed impulses.

Numerous types of pulse-generating and pulse-forming circuits have been evolved and employed for generating short time duration impulses. In many solid-state impulse generators employing transistors and similar relay devices, the transistors are operated at their saturation region, which inherently reduces the ultimate speed of operation of the switching action achieved and thus limits the narrowness that can be attained in the generated pulses. Those generators that do not employ saturation-operated relay devices, moreover, require critical circuit parameters, are subject to changes with substituted components, and generally inherently involve considerable power dissipation in the transistors or similar relay devices.

An object of the present invention, accordingly, is to overcome the above-mentioned limitations through a new and improved electric system that, in summary, operates at preselected voltage levels below saturation of the transistor or other relays, and with higher speeds of operation that result in narrower generated pulses.

A further object is to provide a novel narrow-pulse generator.

An additional object is to provide a novel signal-amplitude or pulse-height discriminator involving systems of the above-described character.

Other and further objects will be explained hereinafter and will be more particularly pointed out in connection with the appended claims.

The invention will now be described in connection with the accompanying drawing the single figure of which is a schematic circuit diagram illustrating a preferred embodiment of the invention.

Referring to the drawing, an input signal of any desired varying amplitude, polarity or wave-shape, may be applied to input terminals 1 and 3, the latter of which is shown grounded at G. The term "ground" as employed herein is intended to embrace not only actual earthing, but chassis or other reference potential as well.

In accordance with the invention, there results at output terminal 5 (or, strictly, between output terminal 5 and the output ground terminal G′) an output pulse 0 of predetermined polarity and wave-shape, shown as a steep negative pulse for purposes of illustration, irrespective of the nature of amplitude variation or rate of amplitude variation of the input signal applied to the input terminals 1 and 3, within wide limits.

The electric system involves, basically, an input switching stage, generally designated at I, a signal-producing stage, indicated generally at II, and a pair of similar switching circuits III and III′ that ultimately connect with the output terminals 5–G′. The input switching circuit I comprises an amplifier stage, illustrated as a transistor relay 7, a Zener diode Z, and a tunnel diode TD, later described. The base 9 of the relay 7 connects through a resistance-capacitance input coupling circuit 11 to the input terminal 1, and the emitter 13 thereof is connected to the before-mentioned input terminal 3. Voltage from a negative voltage source, labeled "−6 volt," is applied through a resistor $R_1$ to the collector 15 of the relay 7. The collector 15 is connected through a Zener diode or similar device Z and through a coupling capacitor $C_1$ to the base 9′ of a transistor amplifying relay 7′. A tunnel diode or similar device TD is connected from the Zener diode Z to the ground terminal G. The emitter 13′ of the transistor 7′ of the second stage II is connected to ground G. Bias for the stage 7′ is attained from the voltage divider network $R_3$–$R_4$ connected between the "−6 volt" terminal and the grounded input terminal 3, with the junction of resistor $R_3$ and $R_4$ connected to the base 9′.

In accordance with the invention, the transistor stage 7 is not operated at saturation; but, to the contrary, has its switching action controlled in accordance with a voltage level adjusted by a potentiometer P, connected through a resistor $R_5$ to the base 9 of the relay 7. The slider of the potentiometer P is shown by-passed by the capacitor $C_3$, to ground. Through the control of the voltage level tapped off by the potentiometer P, the current that is passed through the relay 7 and from the collector 15 to the Zener diode Z may be controlled. The voltage level at P is adjusted so that when the collector voltage at 15 reaches a value of, say, −2.5 volts, the Zener diode Z (selected in this example to have a 2.5-volt Zener-diode threshold conducting voltage), will conduct and will cause the tunnel diode TD to switch to its stable high-voltage state. As will later be evident, if one were to vary the slider P back and forth through this predetermined voltage level value, an output pulse 0 would be produced at the output terminal 5 each time the slider P, in one direction of movement, adjusted the base 9 of the relay 7 to the predetermined voltage level.

This generation or production of the output pulse 0 may be traced from the collector 15′ of the relay 7′ through a primary winding $P_1$ of a first transformer $T_1$. The upper terminal of the primary $P_1$ is supplied with voltage through a resistor $R_6$ and is by-passed to ground by capacitor $C_4$. The primary winding $P_1$ is electromagnetically coupled to a pair of similar phase-splitting secondary windings $S_1$ and $S_1'$. The windings may have a 1-to-1 ratio, or they may be designed to be stepped-up or stepped-down. Opposite terminals of the secondary windings $S_1$ and $S_1'$, however, are grounded′. The ungrounded terminals thereof are respectively connected to the bases 19 and 19′ of a pair of similar switching transistor circuit stages III and III′, the emitters 23 and 23′ of which are shown grounded in order to enable the stages III and III′ to respond only to negative input signals. The secondary winding $S_1$ will produce an output signal for switching the stage III with increasing current in $P_1$; whereas the secondary winding $S_1'$ will produce an output signal of the same polarity, with decreasing current in the primary winding $P_1$ for switching the stage III′.

The collectors 25 and 25′ of the stages III and III′ are connected through respective clamping diodes $D_1$ and $D_1'$ (that prevent the application of opposite-polarity voltages to the respective collectors 25 and 25′ when the stages III and III′ are cut off) to similar primary windings $P_2$ and $P_2'$ of a further transformer $T_2$. Connections continue through resistors $R_7$ and $R_7'$ to a pair of contact terminals 30 and 30′, only one of which at a time may be connected through a switch S to the "−6 volt" voltage-supply terminal. Thus, at any one time, only one of the pair of switching relays III and III′ will be operative to respond to a negative impulse applied to respective bases 19 and 19′ in order to produce switching action thereof and to generate in the respective windings $P_2$ and $P_2'$ similar polarity pulses. A common output secondary windings $S_2$, the lower terminal of which is shown grounded and which may be shunted by a diode D2, communicates with both of the windings $P_2$ and $P_2'$ and generates the output pulse 0 of fixed, predetermined polarity and wave-shape in response to the switching action of either of the pair of stages III and III'.

It may thus be shown that when, for example, a negative-going signal is applied to the input terminals 1, 3, and its downward excursion reaches the predetermined voltage level set by the potentiometer P, the input switching circuit I will produce increased conduction in the stage 7 and will cause the tunnel diode TD to switch from its stable high-voltage state to its stable low-voltage state in a very brief interval of time. This will result in the generation of an impulse in the primary winding $P_1$ which will produce an increase in current in one of the secondary windings $S_1$ or $S_1'$. Depending upon the position of the switch S, which may render either of the pair of transistor stages III or III' operative to respond to the application of, say a negative-going signal from $S_1$ or $S_1'$, either the primary winding $P_2$ or the primary winding $P_2'$ will be energized to produce an output pulse that will give rise to the same polarity output pulse 0 at the terminal 5 associated with the secondary winding $S_2$ of the output-transformer $T_2'$.

It will be observed, however, that a change in amplitude at the input pulse at 1–3 in the opposite direction, will not result in an output pulse 0 because the stage III or III' that receives an appropriate negative pulse will not then be connected to the switch S and to the collector voltage supply terminal "–6 volt." No output pulse 0 will therefore be produced as the input signal approaches the predetermined voltage level at P from the opposite direction, in the illustrative example.

By virtue of the fact that the transistors 7, 7' in this circuit are not operated at saturation, the limitations on pulse width or speed inherent in saturation-switching action do not exist. While, as before stated, there are prior pulse-generating circuits that also do not saturate the relays, they inherently involve large power dissipation in the transistors that is not involved in the kind of circuit above-described.

As an illustration, a circuit involving transistors 7, 7', III and III' of the 2N976 type, operating with a tunnel diode of the 1N3717 type, and bifilar transformer windings $T_1$ and $T_2$ of about 2-to-4 turns of No. 40 wire wound upon a Ferroxcube 1Z3 toroidal core, have been found to produce, with the circuit illustrated, output pulses 0 of the order of 1½ volts with very narrow pulse widths of from 10 down to 1½ nanoseconds. The circuit of the present invention is thus a very high-speed circuit adapted to operate at very high frequencies even in excess of 100 megacycles.

If desired, a pair of circuits of this character, shown in the drawing, may be employed for amplitude or pulse height discrimination. The predetermined voltage level P of the upper circuit and the predetermined voltage level at P' in the similar lower circuit may be adjusted to different values, with the resulting output pulses 0 and 0' fed, respectively, to the collector 50 and base 52 of an output gating stage IV, the emitter 54 of which is grounded. An output signal will then result from the gating stage IV, at the ultimate output terminal 55, only when the input signals applied to the two systems are both within the predetermined voltage levels set at P and P' and the resulting pulses 0 and 0' do not occur simultaneously. This can readily be seen from the fact that if 0 and 0' occur at different times, when the application of negative collector voltage occurs at 5 by means of pulse 0, an output will result at 55. When pulses 0 and 0' (controlled respectively by appropriate adjustment at P and P') occur simultaneously, the collector 50 becomes effectively grounded at 54 by conduction through the gate IV, and no resultant output will occur at 55. This condition of no output at 55 is thus a condition discriminating against simultaneous input pulses of different amplitude or height than those for which P and P' were pre-set. Thus signal amplitude or pulse-height discrimination is readily attainable.

While transformers $S_1$–$S_1'$, etc. are illustrated, other types of phase-splitting components, such as a transistor phase splitter, may be employed in their place, if desired, though the simplicity and low cost of the illustrated circuit is preferred. Further modifications will also suggest themselves to those skilled in the art and are considered to fall within the spirit and scope of the invention as claimed.

What is claimed is:

1. An electric system for producing an output pulse of predetermined polarity and wave-shape in response to a varying amplitude input signal of any desired polarity and wave-shape, that comprises, an input switching circuit having switching means of predetermined switching voltage level at which the switching circuit will switch between a pair of stable states in response to the reaching of such level in the input circuit, means for pre-adjusting said voltage level, means responsive to the switching of the input circuit to produce a first signal of predetermined polarity upon switching to one of the pair of states and a second signal of the same predetermined polarity upon switching to the other state, a pair of similar further switching circuits connected to receive, respectively, the said first and second signals, means for rendering only one of the pair of similar further switching circuits operative to produce switching upon receipt of such signal, and a common output circuit responsive to the pair of further switching circuits for producing an output pulse of predetermined polarity and wave-shape in response to the switching of either of the pair of further switching circuits.

2. An electric system as claimed in claim 1 and in which the said input switching circuit comprises a tunnel diode having stable high and low-voltage states, and a switching device biased by the said predetermined voltage level for causing the tunnel diode to switch between its said states when an input signal applied to the input circuit passes through the said voltage level in one direction.

3. An electric system as claimed in claim 2 and in which the said switching device comprises a transistor stage the output of which connects through a Zener diode to the said tunnel diode.

4. An electric system as claimed in claim 1 and in which the said responsive means comprises a phase-splitter.

5. An electric system as claimed in claim 4 and in which the phase-splitter comprises a transformer having a primary winding and cooperative pair of opposite-terminal-grounded similar secondary windings the other terminals of which are each connected to one of the said pair of further switching circuits.

6. An electric system as claimed in claim 5 and in which a transistor amplifier is interposed between the said input switching circuit and the said primary winding of the said transformer.

7. An electric system as claimed in claim 1 and in which each of the pair of further switching circuits comprises a transistor stage connected through a transformer primary winding to the said rendering means.

8. An electric system as claimed in claim 7 and in which the said rendering means comprises a switch operative to apply operating voltage to one of the said further switching circuit transistor stages at a time.

9. An electric system as claimed in claim 8 and in which the said common output circuit comprises a common secondary winding cooperative with the transformer primary windings of both of the pair of further switching circuits.

10. An electric system having a pair of systems as claimed in claim 1, each input circuit of which is adjusted to a different predetermined value, and a gating circuit connected to the said common output circuit of each of the pair of systems.

References Cited by the Examiner

UNITED STATES PATENTS

| | | | |
|---|---|---|---|
| 3,031,588 | 4/1962 | Hilsenrath | 307—88.5 |
| 3,053,995 | 9/1962 | Hallberg | 307—88.5 |
| 3,115,582 | 12/1963 | Yoshii et al. | 307—88.5 |

OTHER REFERENCES

A. Adler et al.: Nuclear Instruments and Methods, vol. 13, No. 2, September 1961, North Holland Publishing Co., pp. 197–200 "100 mc./s. Tunnel-Diode Discriminator and Pulse-Shaper."

R. C. Fisher: IBM Technical Disclosure Bulletin, vol. 4 No. 9, February 1962, "Transistor-Esaki Diode Shift Register," page 45.

DAVID J. GALVIN, *Primary Examiner.*

ARTHUR GAUSS, *Examiner.*